United States Patent

McGregor et al.

[11] Patent Number: 5,842,869
[45] Date of Patent: Dec. 1, 1998

[54] METHOD AND APPARATUS FOR DISPLAYING QUESTION AND ANSWER DATA ON PLURAL DISPLAYS

[76] Inventors: John McGregor, 1520 S. Woodhaven, Baton Rouge, La. 70815; Ronnie Shaab, 3363 Hundred Oaks, Baton Rouge, La. 70808; Stanley Brohn, 10265 Darryl Dr., Baton Rouge, La. 70815

[21] Appl. No.: 955,804

[22] Filed: Oct. 22, 1997

[51] Int. Cl.$^6$ .............................. G09B 5/00; G09B 7/00
[52] U.S. Cl. ......................... 434/201; 434/323; 434/325
[58] Field of Search .................................. 434/118, 156, 434/157, 167, 169, 185, 188, 189, 191, 192, 201, 236, 237, 238, 307 R, 322, 323, 324, 336, 350, 351, 352, 362, 433, 335

[56] References Cited

U.S. PATENT DOCUMENTS

| | | |
|---|---|---|
| D. 300,539 | 4/1989 | Wong . |
| 3,628,255 | 12/1971 | Golden ..................................... 434/325 |
| 3,699,667 | 10/1972 | Gomez ..................................... 434/201 |
| 3,925,909 | 12/1975 | Duncan . |
| 3,974,575 | 8/1976 | Duncan . |
| 4,154,007 | 5/1979 | Judd . |
| 4,217,656 | 8/1980 | Hirano et al. . |
| 4,225,932 | 9/1980 | Hirano et al. . |
| 4,247,895 | 1/1981 | Weber . |
| 4,348,744 | 9/1982 | White . |
| 4,713,495 | 12/1987 | Jalava . |
| 4,836,786 | 6/1989 | Wong . |
| 5,002,491 | 3/1991 | Abrahamson et al. .................. 434/322 |
| 5,035,502 | 7/1991 | Stokes . |
| 5,494,444 | 2/1996 | Thayer et al. ........................... 434/362 |

Primary Examiner—Robert A. Hafer
Assistant Examiner—John Edmund Rovnak

[57] ABSTRACT

An electronic device for displaying question data and answer data includes an input device for entering commands, first and second displays, and a processor. The question data is displayed on the first display which is visible to an operator of the electronic device and on a second display which is visible from a position from which the first display is not visible, i.e., the position of an observer such as a student. The operator can selectively control the displaying of the answer data on each of the displays using commands entered on the input device. Entry of a first command causes the answer data to be display only on the first display so that the answer is visible only to the operator. Entry of a second command causes the answer data to be displayed on the second display so that the observer can also see the answer. In one mode of operation, the question and answer data for many questions is stored in a storage device, and the questions are categorized by level of difficulty or by subject. The operator selects the category of questions to be presented, and the question and answer data for each question in the category is automatically retrieved from the storage device for display on the first and second displays. The operator enters commands through the input device to display each successive question and to selectively control the displaying of the answer to each question on the first and second displays.

50 Claims, 4 Drawing Sheets

METHOD AND APPARATUS FOR DISPLAYING QUESTION AND ANSWER DATA ON PLURAL DISPLAYS

BACKGROUND OF THE INVENTION

1. Field of the Invention

The present invention relates to a method and apparatus for displaying question and answer data on plural displays. In particular, the present invention relates to a method and apparatus for displaying, on at least two displays, images, characters or symbols which pose a question or prompt a response from an observer, and for selectively controlling the displaying of the answer to the question on each of the displays.

2. Description of the Related Art

Flashcards have been used for many years by instructors as a teaching aid to drill students in subjects such as mathematics. Typically, a two-sided, cardboard flashcard has a "question" side and an "answer" side. The "question" side has printed thereon a question pertaining to some discipline, such as mathematics, language, science, history, the arts or the like. The "answer" side has printed thereon the answer to the question that is printed on the "question" side of the flashcard. In operation, the "question" side of the flashcard is presented to the student by the instructor, while the instructor views the "answer" side of the flashcard. The student reads the question presented and attempts to answer the question as quickly as possible. Generally, the instructor holds a stack of flashcards, and presents the flashcards to the student in rapid succession to assist the student in memorization of information or development of skills in mathematics or the like.

Conventional flashcards have several disadvantages. Flashcards can be awkward to use, since the instructor must hold a substantial number of flashcards at once and handle many flashcards during a short period of time. Further, even with a large set of flashcards, the number of different questions that can be presented to a student is inherently limited by the number of flashcards. Moreover, a large set of flashcards is bulky and requires significant storage space. Furthermore, flashcards become worn and damaged through repeated use over time, and individual flashcards may get lost.

In recent years, a number of electronic, instructional devices have been disclosed which are designed to present questions to a user. These devices typically allow a student to answer questions presented on a display without the direct intervention of an instructor. For example, Duncan (U.S. Pat. Nos. 3,925,909 and 3,974,575) discloses a teaching machine having a keypad and a display, wherein a punch card is fed into the machine, and an equation printed on the punch card is viewed through a window on the machine. The user enters a solution to the displayed equation via the keypad, and the solution is displayed on the display only when the user has entered the correct answer.

Hirano et al. (U.S. Pat. No. 4,217,656) disclose an electronic calculator for educational use, wherein an equation is displayed on a display of the calculator. The solution to the displayed equation is then entered from the keypad. The calculator does not display the solution entered from the keypad unless it is the correct answer. Hirano et al. (U.S. Pat. No. 4,225,932) further disclose an electronic calculator useful for teaching multiplication and division. In operation, an equation is entered through the keypad of the calculator and displayed on the display. Each successive depressing of the "=" key causes a partial solution to the equation to be displayed. After all of the partial solutions to the equation have been displayed, the final solution to the equation is displayed when the "=" key is depressed again. For example, with the equation 4321×123, four successive depressions of the "=" key cause the three partial solutions and the final solution to be successively displayed.

Weber (U.S. Pat. No. 4,247,895) discloses a calculator for teaching arithmetic. The calculator displays randomly generated equations on the display, and the user enters the solution via a keypad. In a first mode, no time constraints are placed upon the user. In a second, "flashcard" mode, the user has a limited amount of time to enter the correct answer. The calculator keeps track of which problems were answered incorrectly and allows the user to retry the incorrectly answered problems after a "test" has been completed.

Although some of the devices disclosed in the above-described documents store answers for later review by the instructor, none of the devices allows the instructor to directly interact with the student while questions are being presented and answered. In particular, each of these devices includes a keypad operated by the student and a display which is visible to the student and disposed on the same surface as the keypad. None of the devices includes a separate display for the instructor or means for the instructor to enter a question while the student is using the device. In other words, these devices are designed for a single user, namely, the student. Consequently, these devices make it difficult for the instructor to directly observe how the student is progressing while questions are being presented and answered.

Other electronic devices designed for educational purposes have been proposed.

For example, Wong (U.S. Pat. No. 4,836,786) discloses a demonstration calculator having transparent display and keyboard sections. Light can be transmitted through the keyboard and the display to project images thereof onto an overhead display. Similarly, Judd (U.S. Pat. No. 4,154,007) discloses a demonstration calculator having a single, liquid crystal display which is supported on a transparent substrate so that light from an overhead projector can be transmitted through the display. Further, Stokes (U.S. Pat. No. 5.035, 502) discloses a calculator having transparent display and keyboard sections. While these devices are useful for demonstration purposes (e.g., demonstrating how to use a calculator), these devices are not particularly useful for presenting questions to students, since the solution is not visible to the instructor until the solution is also visible to the students.

SUMMARY OF THE INVENTION

It is an object of the present invention to display question and answer data on at least first and second displays of an electronic device. More particularly, it is an object of the present invention to selectively control the displaying of the answer data on each of the displays, such that an operator of the electronic device (e.g., an instructor) can see the answer data on the first display before an observer (e.g., a student) can see the answer on the second display.

It is a further object of the present invention to allow an instructor to interactively present questions to a student using an electronic device, without the disadvantages inherent in conventional flashcards.

Yet another object of the present invention is to automatically (i.e., without having to enter question data) present a series of stored or randomly generated questions to an observer on a display, wherein an operator of the device controls the displaying of the answer to each of the displayed questions.

The aforesaid objects are achieved individually and in combination, and it is not intended that the present invention be construed as requiring two or more of the objects to be combined unless expressly required by the claims attached hereto.

According to the present invention, an electronic device includes a processor which controls the displaying of question data and answer data on a first display and a second display. Specifically, the question data is displayed on a first display which is visible to the operator and on a second display which is visible from a position from which the first display is not visible, i.e., the position of an observer such as a student. The operator can selectively control the displaying of the answer on each of the displays using commands entered through an input device. For example, entry of a first command causes the answer to be display only on the first display so that the answer is visible only to the operator. Entry of a second command causes the answer to be displayed on the second display so that the observer can also see the answer.

Alternatively, the question and answer data can be displayed at predetermined intervals in response to processor-generated commands based on an internal timer. For example, at a first time, the question data is displayed on the first and second displays and the answer data is displayed on the first display, and at a second time (delayed relative to the first time), the answer data is displayed on the second display.

Question data can be entered by an operator via an input device (e.g., keypad or keyboard), randomly generated, or retrieved from a storage device. Answer data can be computed based on the value of the question data or retrieved from a storage device.

The present invention advantageously allows direct interaction between an instructor presenting questions and a student responding to the questions, without the aforementioned disadvantages inherent with flashcards.

According to one mode of operation of the present invention, the question and answer data for many questions is stored in a storage device, and the questions are categorized by level of difficulty or by subject; thus, the operator is not required to enter question data through the input device. Instead, the operator selects, via the input device, the category of questions to be presented. For example, the operator can enter the grade level of the observer to select a set of questions of appropriate difficulty. Similarly, the operator can select a set of questions relating to a particular subject, such as arithmetic. Once the category of questions has been selected, the question and answer data for each question is automatically retrieved from the storage device for display on the first and second displays. The operator enters commands through the input device to display each successive question and to selectively control the displaying of the answer to each question on the first and second displays. Alternatively, once the category of questions has been selected, the processor controls the displaying of the question data and answer data for a sequence of questions, such that the answer data is displayed on the second display at a predetermined time after the answer data is displayed on the first display.

Additional displays which function like the second display can be used so that more observers can view the questions and participate in responding to the questions. The device can be used for educational purposes, with questions relating to virtually any educational discipline; alternatively, the device can be used for entertainment, with questions relating to trivia or the like.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

The FIG. 1 is a functional block diagram of an electronic device for displaying question and answer data according to the present invention.

DESCRIPTION OF THE PREFERRED EMBODIMENTS

Figure 1:
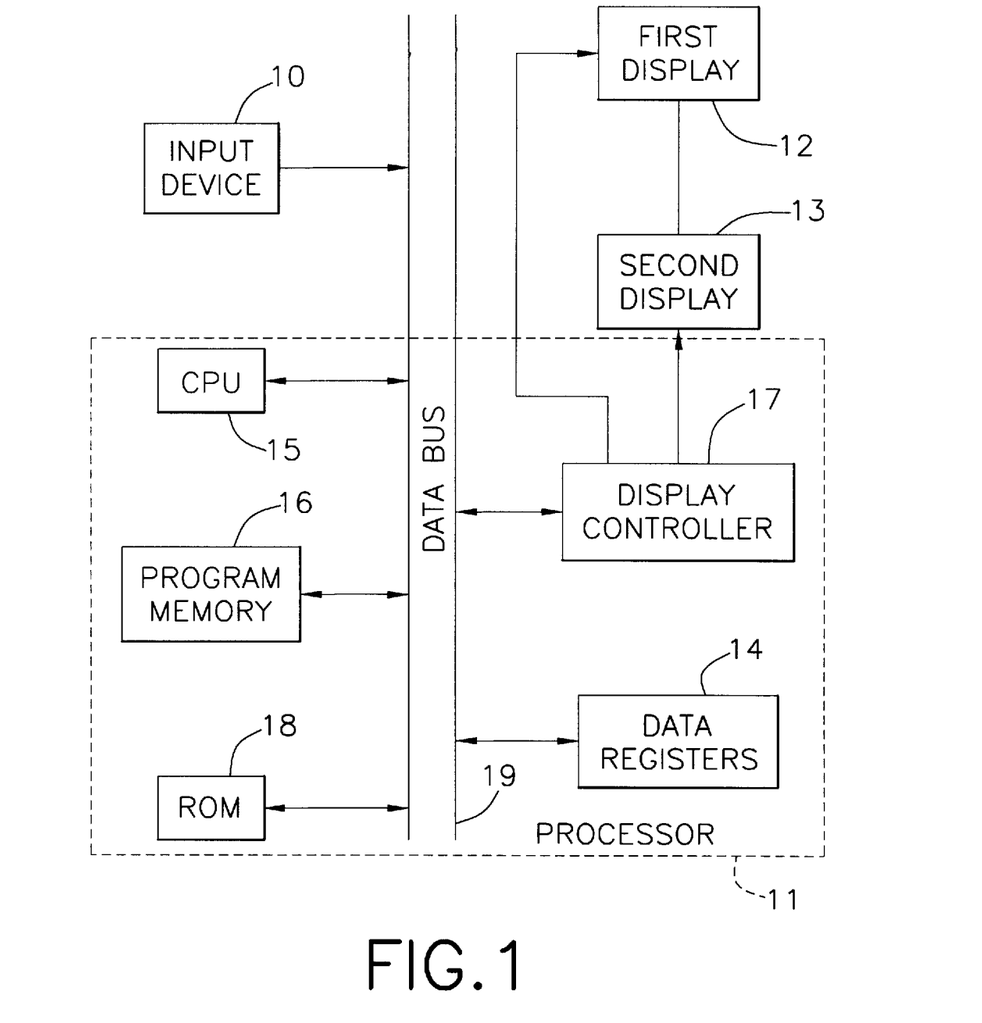

A functional block diagram of an electronic device for displaying question and answer data according to a preferred embodiment of the present invention is illustrated in FIG. 1. Question data is data which, when displayed, poses a question or prompts an observer to respond. For example, the question data can include first and second mathematical operands (e.g., two numbers) and a mathematical operator (e.g., $+, -, \times, \div$). More generally, question data can represent a question relating to any discipline, such as mathematics, language, science, history, the arts, sports, trivia or the like. Answer data is data which, when displayed, allows the observer to see the correct answer or response to the displayed question. The displayed question and answer data can be in any form which conveys a question and answer to the observer, including, but not limited to, alphanumeric characters, symbols, and images.

As shown in FIG. 1, the electronic device includes an input device 10, a processor 11 and first and second displays 12 and 13. The input device 10 can be any device for entering data and/or commands, including, but not limited to: a calculator-like keypad, an alphanumeric keypad or keyboard, a computer keyboard, a touch-sensitive device (e.g., a pad or a screen), a voice recognition device, or any combination thereof.

As explained in greater detail hereinbelow, the input device 10 is used by the operator to enter commands to control the displaying of question and answer data on the first and second displays 12 and 13.

The input device 10 can also be used to directly enter question data. For example, numbers can be entered by pressing numbered keys on a keypad. Alternatively, the input device can be used to enter commands to retrieve question data from a data storage device, e.g., a read-only memory (ROM), a floppy disk, a compact disk read-only memory (CD-ROM), a cartridge or a tape (represented in FIG. 1 as ROM 18). A data selection command can be used to retrieve data for an individual question; alteratively, a data selection command can be used to select data for a set of questions. For example, a command can specify a particular category of questions stored in ROM 18. According to yet another alternative, the question data can be randomly generated. For example, the question data can be a mathematical equation, where the operands and the mathematical operator are randomly generated.

The processor 11 receives data and/or commands from the input device 10 and controls the first and second displays 12 and 13 in accordance with the commands and/or data. In the example shown in FIG. 1, the processor 11 includes data registers 14 for temporarily storing commands and/or data entered via the input device 10, a central processing unit 15, and a program memory 16 into which is loaded a machine language program. By executing the machine language program, the central processing unit 15 processes the commands and/or data in the data registers 14 and produces answer data which can be stored in the data registers 14. The answer data can be generated from a logical or mathematical computation performed by the CPU 15 on the question data stored in data registers 14. For example, two operands (e.g., two numbers) and a mathematical operator (e.g., +, −, × or ÷) can be entered via the input device 10, and signals representing the operands and the mathematical operator are stored in the data registers 14. In response to a command entered via the input device 10 (e.g., pressing the "=" key), the CPU 15 processes the operand signals in accordance with the machine language instruction corresponding to the operation specified by the mathematical operator. The result of the processing (i.e., a third number) is also stored in one of the data registers 14.

Alternatively, the answer data can be data retrieved from ROM 18 based on the value of the question data entered from the input device 10. For example, ROM 18 can contain a look-up table of data that corresponds to certain question data. According to another alternative, corresponding question and answer data can be stored together in ROM 18 and retrieved in accordance with a data selection command entered via the input device 10.

The processor 11 further includes a display controller 17 which controls the first and second displays 12 and 13 to display the question and answer data in accordance with display control commands entered via the input device 10.

The components and architecture of the processor 11 shown in FIG. 1 are illustrative of the functions performed by the processor; however, the processor of the present invention is not limited to any particular set of components or architecture. The processor can have any architecture or components capable of carrying out control of the first and second displays 12 and 13 in the manner prescribed herein in accordance with the present invention.

Each of the first and second displays 12 and 13 preferably is visible under a wide variety of lighting conditions and can be any conventional display device, including but not limited to: a light emitting diode (LED) display; a liquid crystal display (LCD); or a cathode ray tube (CRT).

The first display 12 is oriented to be visible to the input device operator, such as an instructor. The second display 13 is oriented relative to the first display 12 such that the second display 13 is visible from a position from which the first display 12 is not visible (e.g., the position of a student). For example, the first and second displays can be respectively located on opposite sides of a two-sided, card-shaped device. Alternatively, the first display can be a first CRT facing one direction, and the second display can be a second CRT facing a direction which is substantially the opposite of the direction that the first display is facing. More generally, the device can include additional displays, each of which is visible from a position from which the first display is not visible. Each of these additional displays is controlled in the same manner as the second display. For example, a first display can be visible to an instructor, and second, third and fourth displays can be visible to students located throughout a classroom or the like.

The first and second displays 12 and 13 are controlled in the following manner. In response to a command entered via the input device 10, the display controller 17 displays the question data on the first and second displays 12 and 13. All of the question data can be displayed at once, or the question data can be displayed in stages. Further, the command for displaying the question data can simply be the entry of the data itself. For example, when the question data is two numbers and a mathematical operator, the question data can be displayed as it is being entered. Alternatively, the first number and the mathematical operator may be displayed only after the mathematical operator is entered, with the second number being displayed only after the "=" key is pressed. Further, the question data can be displayed on both the first and second displays 12 and 13 simultaneously, or the question data can be displayed as it is entered on the first display 12, while the question data is not displayed on the second display until all of the question data has been entered (e.g., after the "=" key has been pressed).

The answer data is displayed on the first display 12 (together with the question data) in response to a command entered via the input device 10. The command for displaying the answer data on the first display 12 can be the same command used to display some or all of the question data on the first and second displays 12 and 13. For example, the electronic device can be configured such that pressing the "=" key causes some or all of the question data to be displayed on the first and second displays 12 and 13 and also causes the answer data to be displayed on the first display 12. According to another example, where the question and answer data is retrieved from a storage device (e.g., ROM 18), the answer data can be displayed on the first display 12 at the same time that the question data is displayed. Alternatively, the command for displaying the answer data on the first display 12 can be distinct from the command(s) for displaying the question data.

The answer data is displayed on the second display 13 in response to a separate command entered via the input device 10 (of course, the question data remains displayed on the first and second displays 12 and 13 and the answer data remains displayed on the first display 12 when the answer data is displayed on the second display 13). Importantly, the command for displaying the answer data on the first display 12 must be distinct from the command for displaying the answer data on the second display 13, and the input device 10 must allow for entry of these two distinct commands. For example, the input device can include a dedicated key (e.g., a "send" key) for commanding the display controller 17 to display the answer data on the second display 13. Alternatively, displaying of the answer data on the second display 13 can be effected by pressing a command key a second time, e.g., pressing the "=" once causes the answer data to be displayed on the first display 12, and pressing the "=" key a second time causes the answer data to be displayed on the second display 13. If there are multiple "observer" displays, display of the answer data on those displays may be simultaneous by means of a common command, or selective by means of multiple operator-initiated commands.

Alternatively, the "commands" for displaying the question data and answer data can be internally generated by the processor 11; thus, the operator is not required to enter display control commands via the input device 10 for each question presented. For example, where the question data is entered via the input device 10, the answer data can be automatically displayed (i.e., without entering a command) on the second side at a predetermined time after the answer data is displayed on the first side.

Further, where a data selection command is used to select question and answer data for a set (e.g., category) of questions (i.e., by randomly generating questions or retrieving questions from storage), the displaying of individual question and answer data can be controlled by the processor 11. For example, at a first time, the question data is displayed on the first and second displays 12 and 13 and the answer data is displayed on the first display 12. At a second time specified by the processor, which is a predetermined time after the first time, the answer data is displayed on the second display 13. Subsequent questions and answers can be displayed automatically at predetermined intervals, or the operator can initiate the displaying of each question via a command entered on the input device 10. The time interval between displaying the question data and the answer data on the second display can be adjusted by the operator of the electronic device via a command entered on the input device 10. The time interval between successive questions can be adjusted by the operator in a similar manner.

For simplicity, a data bus 19 connecting the input device 10 and the processor components 14–18 is shown FIG. 1, wherein data, commands and addresses flow between the system components via the data bus 19. More generally, communication of data, commands and addresses between components of the system can be carried out in any conventional manner. For example, the input device 10 and/or the first and second displays 12 and 13 can be physically separated from the processor and can transmit and receive data and commands via separate wire connections or via wireless connections (e.g., infrared or ultrasonic remote control).

Figure 2A:
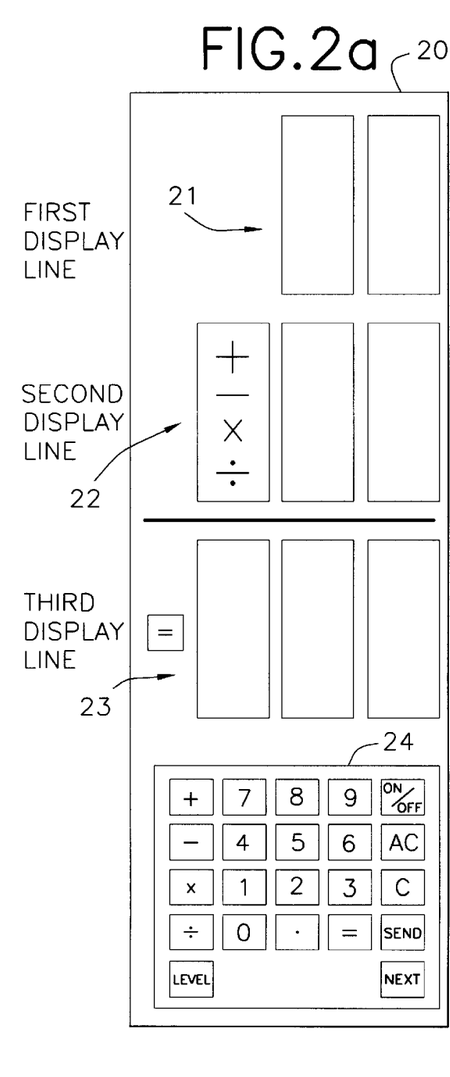
FIG. 2a is a schematic illustration of a first side of an exemplary electronic display device for displaying question and answer data according to the present invention.
Figure 2B:
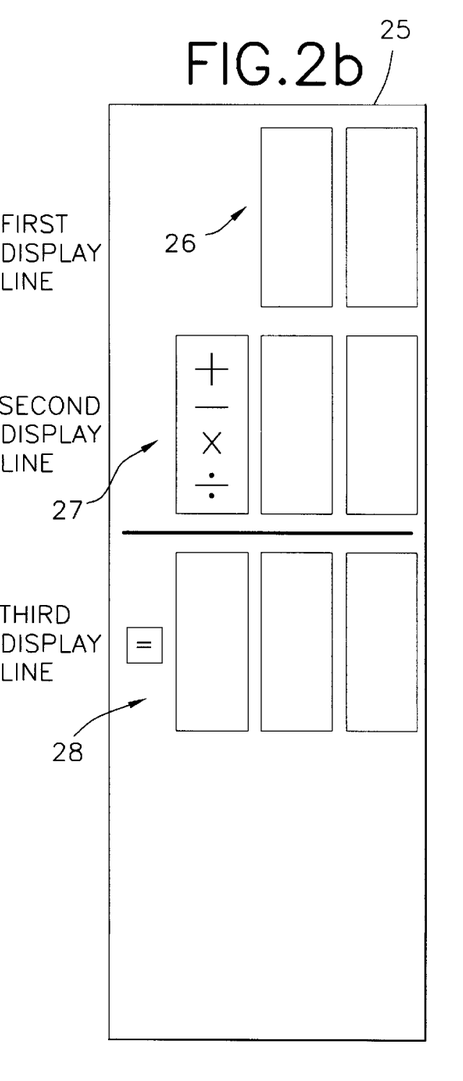
FIG. 2b is a schematic illustration of a second side of the exemplary electronic device for displaying question and answer data according to the present invention.

A specific example of a two-sided electronic device for displaying question and answer data according to the present invention is illustrated in FIGS. 2a and 2b. In particular, the electronic device preferably has a flat, thin casing with two opposing, rectangularly-shaped sides, namely, the first side 20 and the second side 25 shown in FIGS. 2a and 2b, respectively. The question data is a mathematical equation, and the answer data is the solution to the mathematical equation.

As shown in FIG. 2a, the first side of the device includes a first three-line display and a keypad 24 for entering mathematical equations. Specifically, the first display includes a first display line 21 for displaying a first mathematical operand, a second display line 22 for displaying a mathematical operator and a second operand, and a third display line 23 for displaying an equal sign ("=") and a solution to the mathematical equation displayed on the first and second display lines 21 and 22. The first display line 21 comprises two display positions and can thus display up to two digits. The second display line 22 comprises three display positions with the left most position dedicated to the display of the mathematical operand; thus, the second display line can display up to two digits. The third display line 23 has four display positions with the left most position dedicated to the display of the equal sign ("="); thus, the third display line can display up to three digits. The keypad 24 includes an ON/OFF key, a clear key (AC), a clear entry key (C), ten digit keys (0–9), a decimal point key, four mathematical operator keys (+, −, ×, ÷), an "=" key, and a "send" key. The keypad 24 also includes a "level" key and a "next" key which are used in the second mode of operation described below in conjunction with the procedural flow chart illustrated in FIG. 4.

As shown in FIG. 2b, the second side 25 of the electronic device includes a second three-line display similar to the three-line display on first side of the device. Specifically, the second display includes a first display line 26 for displaying a first mathematical operand, a second display line 27 for displaying a mathematical operator and a second operand, and a third display line 28 for displaying an equal sign ("=") and a solution to the mathematical equation displayed on the first and second display lines. The second side 25 of the electronic device does not include a keypad.

It should be understood that the displays shown in FIGS. 2a and 2b are controlled by a processor (not shown) contained within the casing of the electronic device. The processor essentially performs the functions of the processor illustrated in FIG. 1 and described above. Accordingly, a detailed explanation of the processor functions will be omitted from the description of the operation of the electronic device shown in FIGS. 2a and 2b.

Figure 3:
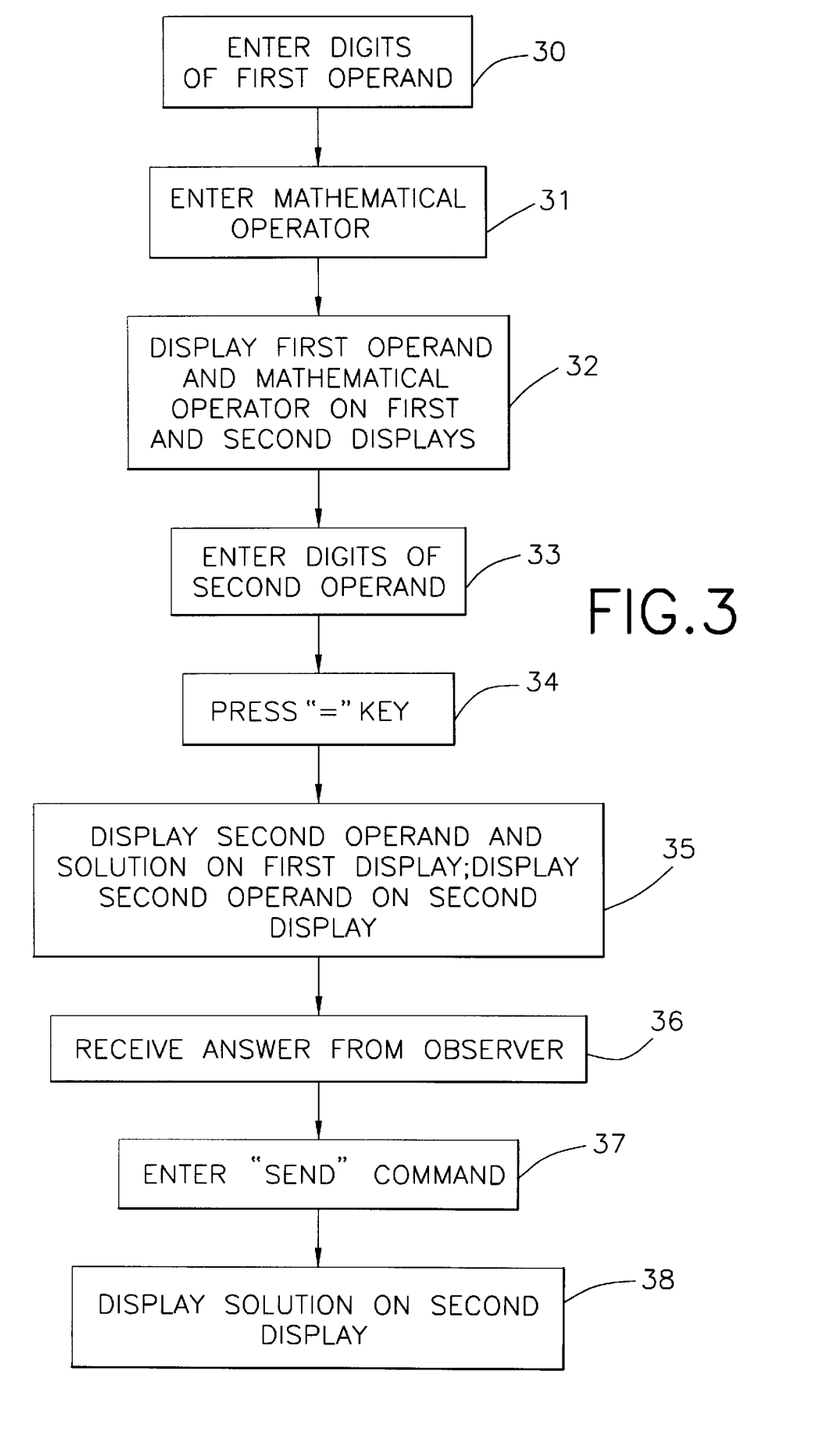
FIG. 3 is a procedural flow chart illustrating the manner in which data is entered, processed and displayed according to a first mode of operation of the electronic device illustrated in FIGS. 2a and 2b.

Operation of the electronic device shown in FIGS. 2a and 2b in accordance with a first mode of operation will be described in conjunction with the procedural flow diagram illustrated in FIG. 3. The electronic device is held by an operator, such as an instructor, such that the first side 20 of the electronic device faces the operator and the second side 25 of the electronic device faces away from the operator. Because the second side 25 opposes the first side 20, when the second side 25 is visible to an observer, such as a student, the first side 20 generally is not visible to the observer.

Using the keypad 24, the operator enters the digits of the first operand (step 30). Next, the operator enters a mathematical operator (+, −, ×, ÷) from the keypad 24 (step 31). Entry of the mathematical operator causes the first operand to be displayed on the first display line 21 on the first side 20 and on the first display line 26 on the second side 25 and also causes the mathematical operator to be displayed in the left most display position of the second display line 22 on the first side 20 and the left most display position of the second display line 27 on the second side 25 (step 32).

Next, using the keypad 24, the operator enters the digits of the second operand (step 33). The operator then presses the "=" key on the keypad 24 (step 34). Pressing of the "=" key causes the second operand to be displayed on the second display line 22 on the first side 20 and on the second display line 27 on the second side 25, and also causes the equal sign to be displayed in the left most display position of the third display line 23 on the first side 20 and the left most display position of the third display line 28 on the second side 25 (step 32). Optionally, the equal sign on the third display line 28 on the second side 25 blinks to indicate that a question is pending and a response is requested. Pressing of the "=" key also causes the solution to the mathematical equation (i.e., the answer data) to be displayed on the third display line 23 on the first side 20, but not on the third display line 28 on the second side 25.

Once the operator has received a response from the observer to the question (i.e., the mathematical equation) displayed on the second side 25 of the electronic device (step 36), the operator then presses the "send" key on the keypad 24 (step 37). Pressing of the "send" key causes the solution to the mathematical equation to be displayed on the third display line 28 on the second side 25 so that the observer can see the solution (step 38). Optionally, the "send" key can be configured such that the answer data is displayed on the second side 25 only while the "send" key is being held down. Additional questions and answers can be displayed by repeating steps 30–38.

Alternatively, the solution to the mathematical equation can be automatically displayed (i.e., without use of a "send" key) on the third display line 28 on the second side 25 at a predetermined time after the "=" key has been pressed.

Figure 4:
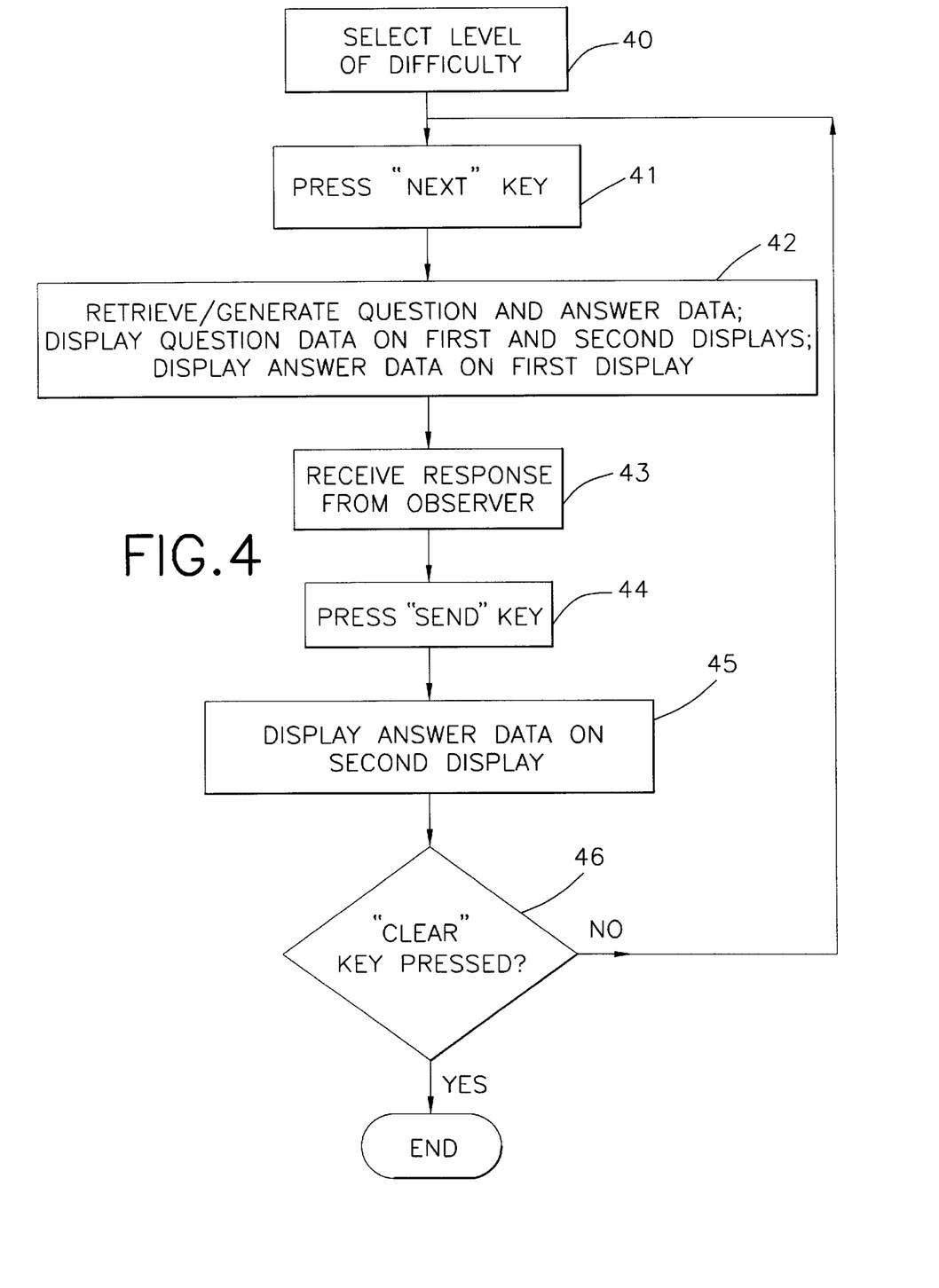
FIG. 4 is a procedural flow chart illustrating the manner in which data is selected, retrieved and displayed according to a second mode of operation of the electronic device illustrated in FIGS. 2a and 2b.

Operation of the electronic device shown in FIGS. 2a and 2b in accordance with a second mode of operation will be described in conjunction with the procedural flow diagram illustrated in FIG. 4. In the second mode of operation, the operator does not enter question data through the keypad 24. Instead, categories of question and answer data are stored in a read-only memory (ROM) or the like within the casing of the electronic device. In this example, the question and answer data is categorized according to different levels of difficulty, with each level of difficulty having a corresponding set of question and answer I1 data for many questions. The order in which questions are retrieved and displayed is preferably randomized to prevent the same questions from appearing in the same order.

Alternatively, the operands and mathematical operator can be randomly generated "on the fly" by the processor. In this case, the degree of difficulty can be controlled by placing limits on the allowable operands and/or mathematic operators for each level of difficulty. For example, at the first level of difficulty, the operands can be limited to one digit, and the mathematical operator can be limited to addition and subtraction.

According to the second mode of operation, the operator selects a category of questions by pressing the "level" key followed by a number key, thereby specifying a level of difficulty (step 40). When the "next" key is pressed by the operator (step 41), question and answer data is displayed on the first side 20, while only question data is displayed on the second side 25 (step 42). Specifically, a first operand is displayed on the first display line 21 on the first side 20 and on the first display line 26 on the second side 25, a mathematical operator is displayed in the left most display position of the second display line 22 on the first side 20 and the left most display position of the second display line 27 on the second side 25, a second operand is displayed on the second display line 22 on the first side 20 and on the second display line 27 on the second side 25, the equal sign is displayed in the left most display position of the third display line 23 on the first side 20 and the left most display position of the third display line 28 on the second side 25, and the solution to the mathematical equation (i.e., the answer data) is displayed on the third display line 23 on the first side 20, but not on the third display line 28 on the second side 25.

Once the operator has received a response from the observer to the question (i.e., the mathematical equation) displayed on the second side 25 of the electronic device (step 43), the operator then presses the "send" key on the keypad 24 (step 44). Pressing of the "send" key causes the solution to the mathematical equation to be displayed on the third display line 28 on the second side 25 so that the observer can see the solution (step 45). Alternatively, the solution to the mathematical equation can be automatically displayed (i.e., without use of a "send" key) on the third display line 28 on the second side 25 at a predetermined time after the "=" key has been pressed.

To change the level of difficulty, the "clear" key (AC) is pressed, and another level of difficulty can be entered by repeating step 40. Otherwise, another question within the same level of difficulty is displayed by repeating steps 41–45. That is, by pressing the "next" key, the next question is displayed on the first and second sides 20 and 25 and the answer is displayed on the first side 20, and by pressing the "send" key, the answer is also displayed on the second side 25.

Alternatively, the next question can be automatically displayed (i.e., without pressing a "next" key) at a predetermined time after the solution to the mathematical equation has been displayed on the third display line 28 on the second side 25.

While the above-described second mode of operation relates to selecting and automatically displaying a group of questions based on a selected level of difficulty, the same principle applies to selection and display of groups of questions categorized in any manner. For example, groups of questions relating to a particular arithmetic operation (e.g., multiplication) can be selected. More generally, questions can be categorized and selected based on any of the above-listed disciplines (e.g., mathematics) or sub-disciplines within a discipline (e.g., calculus). Once the category of questions has been selected, the question and answer data for each question is automatically retrieved from storage (or randomly generated) for display on the first and second displays in the manner described above.

The present invention can be incorporated into an electronic device which is also usable in conventional modes of operation. For example, the electronic device illustrated in FIGS. 2a and 2b can be used as a conventional calculator. Specifically, the electronic device can be placed on a desk with the second side 25 facing the desk and the first side 20 facing away from the desk. The operator can perform computations simply by using the conventional keys (i.e., not using the "send", "level" and "next" keys). More generally, the present invention can be implemented on a general purpose calculator or computer, provided that the operator can selectively control the displaying of answer data on a first display and a second display and provided that the second display is visible from a position from which the first display is not visible.

Further, the present invention can be implemented on an electronic device also capable of operating in a conventional, single person, instructional mode, wherein a user (e.g., student) responses to displayed questions by entering an answer via an input device.

Other features can be added to the electronic device of the present invention without departing from the scope of the invention. For example, the electronic device can store a history of which questions were answered correctly and incorrectly for later review by an instructor. Further, voice electronics and a speaker can be added to allow the device to simultaneously "say" and display the correct answer.

The electronic device of the present invention can be powered by any conventional power source, including a battery, solar power or an alternating current power source. Further, a time-out feature can be incorporated into the electronic device, wherein the electronic device powers down after a specific period of inactivity.

As will be understood from the above description, the electronic device can be used by an instructor, such as a teacher or parent, to rapidly present a series of questions to a student. The electronic device can also be used to teach or rehabilitate people with speech, visual or hearing impairment. Further, the device can be used for entertainment purposes (e.g., presenting trivia questions).

Having described preferred embodiments of a new and improved method and apparatus for displaying question and answer data on plural displays, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An electronic apparatus for displaying question data and answer data, comprising:
   a housing having a first side and a second side;
   a first display on the first side;
   a second display on the second side and visible from a position from which said first display is not visible; and
   a processor disposed within said housing for controlling said first and second displays, such that: the question data is displayed on said first and second displays; the answer data is displayed only on said first display at a first time; and the answer data is displayed on said second display at a second time, which is after the first time, in response to a display control command.

2. The electronic apparatus according to claim 1, further comprising an input device for entering the display control command.

3. The electronic device according to claim 2, wherein said input device comprises one of: a keypad, a keyboard, and a voice recognition device.

4. The electronic apparatus according to claim 1, wherein said processor generates the display control command at predetermined period of time after the first time.

5. The electronic apparatus according to claim 1, wherein the question data is displayed on said first and second displays at the first time.

6. The electronic apparatus according to claim 1, further comprising an input device for entering the question data.

7. The electronic apparatus according to claim 6, wherein said processor computes the answer data from the question data received from said input device.

8. The electronic apparatus according to claim 6, further comprising a data storage device for storing the answer data, wherein said processor retrieves the answer data from said data storage device in accordance with a value of the question data received from said input device.

9. The electronic apparatus according to claim 1, wherein said processor randomly generates the question data.

10. The electronic apparatus according to claim 9, wherein said processor computes the answer data from the question data.

11. The electronic apparatus according to claim 9, further comprising a data storage device for storing the answer data, wherein said processor retrieves the answer data from said data storage device in accordance with a value of the question data.

12. The electronic apparatus according to claim 1, further comprising a data storage device for storing the question data and the answer data, wherein said processor retrieves the question data and the answer data from said data storage device.

13. The electronic apparatus according to claim 1, further comprising:
   an input device for entering a data selection command; and
   a data storage device for storing the question data for a plurality of questions, the plurality of questions being grouped into a plurality of sets of questions, wherein said processor retrieves the question data for one of the sets of questions in accordance with the data selection command.

14. The electronic apparatus according to claim 13, wherein the data selection command specifies a level of difficulty of said one of the sets of questions.

15. The electronic apparatus according to claim 13, wherein the data selection command specifies a subject matter of said one of the sets of questions.

16. The electronic apparatus according to claim 13, wherein said processor computes the answer data corresponding to the question data retrieved from said data storage device.

17. The electronic apparatus according to claim 13, wherein the answer data for the plurality of questions is stored in said data storage device, and wherein said processor retrieves the answer data corresponding to the question data for said one of the sets of questions in accordance with the data selection command entered on said input device.

18. The electronic apparatus according to claim 1, further comprising an input device for entering a data selection command, wherein said processor randomly generates the question data for a plurality of questions in accordance with the data selection command.

19. The electronic apparatus according to claim 18, wherein the data selection command specifies a level of difficulty of the question data to be generated.

20. The electronic apparatus according to claim 18, wherein the data selection command specifies a subject matter of the question data to be generated.

21. The electronic apparatus according to claim 18, wherein said processor computes the answer data from the question data.

22. The electronic apparatus according to claim 18, further comprising a data storage device for storing the answer data, wherein said processor retrieves the answer data from said data storage device in accordance with a value of the question data.

23. The electronic apparatus according to claim 1, wherein said housing comprises a flat, thin casing having first and second opposing sides.

24. The electronic apparatus according to claim 23, further comprising an input device disposed on the first side.

25. The electronic device according to claim 24, wherein said input device comprises one of: a keypad and a keyboard.

26. The electronic device according to claim 23, wherein said question data is a mathematical equation comprising at least one mathematical operand and a mathematical operator, and wherein said answer data comprises a solution to the mathematical equation.

27. The electronic device according to claim 1, wherein each of said first display and said second display is one of: a light emitting diode display, a liquid crystal display and a cathode ray tube.

28. The electronic device according to claim 1, further comprising:
   a third display visible from a position from which said first display is not visible, the question data being displayed on said third display,
   wherein said processor controls said third display such that the answer data is displayed on said third display at the second time in response to the display control command.

29. The electronic device according to claim 1, further comprising:
a third display visible from a position from which said first display is not visible, the question data being displayed on said third display,
wherein said processor controls said third display such that the answer data is displayed on said third display at a third time, which is after the first time, in response to a second display control command.

30. A method of displaying question data and answer data, comprising the steps of:
displaying the question data on a first display on a first side of a housing;
displaying the question data on a second display on a second side of the housing, the second display being visible from a position from which the first display is not visible;
displaying the answer data only on the first display at a first time; and
displaying the answer data on the second display at a second time, which is after the first time, in response to a display control command.

31. The method according to claim 30, further comprising the step of:
entering the display control command on an input device.

32. The method according to claim 30, further comprising the step of:
generating the display control command at a predetermined period of time after the first time.

33. The method according to claim 30, further comprising the step of:
entering the question data on an input device.

34. The method according to claim 33, further comprising the step of:
computing the answer data from a value of the question data.

35. The method according to claim 33, further comprising the step of:
retrieving the answer data from a data storage device in accordance with a value of the question data.

36. The method according to claim 30, further comprising the step of:
randomly generating the question data.

37. The method according to claim 36, further comprising the step of:
computing the answer data from a value of the question data.

38. The method according to claim 36, further comprising the step of:
retrieving the answer data from a data storage device in accordance with a value of the question data.

39. The method according to claim 30, further comprising the step of:
retrieving the question data and the answer data from a data storage device.

40. A method of displaying question data and answer data, comprising the steps of:
a) selecting a set of questions;
b) displaying the question data for one of the questions in the set of questions on a first display on a first side of a housing;
c) displaying the question data for said one of the questions on a second display on a second side of the housing, the second display being visible from a position from which the first display is not visible;
d) displaying the answer data for said one of the questions only on the first display at a first time;
e) displaying the answer data for said one of the questions on the second display at a second time, which is after the first time, in response to a display control command; and
f) repeating steps b), c) d) and e) for another question in the set of questions.

41. The method according to claim 40, wherein step e) further comprises the step of:
e1) entering the display control command on an input device.

42. The method according to claim 40, wherein step e) further comprises the step of:
e1) generating the display control command at a predetermined period of time after the first time.

43. The method according to claim 40, wherein the set of questions is selected in accordance with a data selection command which specifies a level of difficulty of the set of questions.

44. The method according to claim 40, wherein the set of questions is selected in accordance with a data selection command which specifies a subject matter of the set of questions.

45. The method according to claim 40, further comprising the step of:
g) randomly generating the question data for said one of the questions.

46. The method according to claim 45, further comprising the step of:
h) computing the answer data from a value of the question data for said one of the questions.

47. The method according to claim 45, further comprising the step of:
h) retrieving the answer data from a data storage device in accordance with a value of the question data for said one of the questions.

48. The method according to claim 40, further comprising the step of:
g) retrieving the question data for said one of the questions from a data storage device.

49. The method according to claim 48, further comprising the step of:
h) computing the answer data from a value of the question data for said one of the questions.

50. The method according to claim 48, further comprising the step of:
h) retrieving the answer data from the data storage device in accordance with a value of the question data for said one of the questions.

* * * * *